United States Patent [19]

Itagaki et al.

[11] Patent Number: 5,135,769
[45] Date of Patent: Aug. 4, 1992

[54] FAT AND OIL COMPOSITION

[75] Inventors: Kazuo Itagaki; Masatoshi Wada, both of Tokyo, Japan

[73] Assignee: Asahi Denka Kogyo Kabushiki Kaisha, Tokyo, Japan

[21] Appl. No.: 679,242

[22] Filed: Apr. 2, 1991

[30] Foreign Application Priority Data

Apr. 11, 1990 [JP] Japan .................................. 2-95499

[51] Int. Cl.$^5$ ......................................... A23D 9/00
[52] U.S. Cl. ..................................... 426/607; 426/610
[58] Field of Search ............................... 426/607, 610

[56] References Cited

U.S. PATENT DOCUMENTS

| | | | |
|---|---|---|---|
| 2,979,407 | 4/1961 | Duck | 426/607 |
| 2,996,388 | 8/1961 | Lindsay | 426/607 |
| 3,070,445 | 12/1962 | Sinnema | 426/607 |
| 3,084,049 | 4/1963 | Sinnema | 426/607 |
| 3,492,130 | 1/1970 | Harwood | 426/607 |
| 3,537,865 | 11/1970 | Daniels | 426/607 |
| 4,060,646 | 11/1977 | Bringi | 426/607 |
| 4,283,436 | 8/1981 | Soeters | 426/607 |
| 4,705,692 | 11/1987 | Tanaka | 426/607 |
| 4,716,047 | 12/1987 | Biernoth | 426/607 |
| 4,726,959 | 2/1988 | Momura | 426/610 |
| 4,847,105 | 7/1989 | Yokobou | 426/611 |
| 4,873,109 | 10/1989 | Tanaka | 426/601 |
| 4,877,636 | 10/1989 | Koyano | 426/607 |
| 4,910,037 | 3/1990 | Sagi | 426/607 |
| 5,000,975 | 3/1991 | Tomarelli | 426/613 |

FOREIGN PATENT DOCUMENTS

| | | | |
|---|---|---|---|
| 0285422 | 10/1988 | European Pat. Off. | 426/607 |
| 0354025 | 2/1990 | European Pat. Off. | 426/607 |
| 55-15785 | 2/1980 | Japan | 426/607 |
| 0227364 | 7/1987 | Japan | 426/607 |
| 62-201999 | 9/1987 | Japan | 426/607 |
| 2-35039 | 2/1990 | Japan | 426/607 |
| 7304297 | 10/1973 | Netherlands | 426/607 |
| 2035359 | 6/1980 | United Kingdom | 426/607 |
| 0034065 | 8/1981 | United Kingdom | 426/607 |

*Primary Examiner*—Carolyn Paden
*Attorney, Agent, or Firm*—Young & Thompson

[57] ABSTRACT

A fat and oil composition which is suitably used in chocolates and comprises from 10 to 90% by weight of the following fat and oil (A) and from 90 to 10% by weight of the following fat and oil (B):

fat and oil (A): a fat and oil substantially comprising 2-unsaturated-1-3-glyceride(s) as the main component and having an iodine value of from 25 to 50; and fat and oil (B): a fat and oil containing from 30 to 85% by weight of triglycerides, wherein the total carbon atom number of the constituting fatty acids is from 24 to 46 and the ratio of the $C_{32}$ content to the $C_{42}$ content ranges from 0.01 to 0.7 (wherein $C_{32}$, $C_{40}$ and $C_{42}$ respectively refer to triglycerides of the total carbon atom numbers of the constituting fatty acids of 32, 40 and 42).

4 Claims, No Drawings

FAT AND OIL COMPOSITION

BACKGROUND OF THE INVENTION

1. Field of the Invention

This invention relates to a fat and oil composition which is suitably used in chocolates. When added to chocolates, the fat and oil composition of the present invention can impart thereto characteristics which have never been hitherto achieved.

2. Description of the Prior Art

Chocolates are broadly classified into tempered chocolates and nontempered ones depending on the type of fat contained therein. It is relatively easy to produce nontempered chocolates having excellent properties including texture and meltability in mouth. This is because the major portion of fats contained in these nontempered chocolates are hardened vegetable fats and fats obtained by fractionating them and the physical properties (for example, hardness) of these fats can be controlled depending on the degree of hardening of fractionation, which makes it possible to give products of relatively arbitrarily controlled properties. In tempered chocolates, on the other hand, cacao butter and fats having a glyceride structure similar to that of cacao butter are used. These fats are hard at a low temperature since they have a high solid fat content (for example, 70% or above at 10° to 20° C.). This fat content rapidly falls at a temperature of 25° C. or above. Although the above-mentioned properties of these fats make them suitable for chocolates, they might restrict the physical properties of chocolates. There has been proposed the use of a combination of a fat having a low melting point (i.e. 25° C. or below) or a triunsaturated glyceride with a 2-unsaturated-1,3-saturated triglyceride in order to soften a chocolate to be used for coating. It seems that the aimed effects can be achieved thereby. However the above proposal seemingly insists upon the maintenance of the heat resistance of conventional chocolates.

There has been further known to add milk fat in chocolates. However this means aims not at positively improving the physical properties of chocolates but at intensifying the milk flavor thereof.

With the recent diversification in consumers' demands for chocolates, it has been desired to produce tempered chocolates of improved physical properties, compared with conventional ones, including softness and meltability in mouth and blooming resistance, similar to nontempered ones.

SUMMARY OF THE INVENTION

It is an object of the present invention to provide a tempered fat and oil composition whereby the hardness, meltability and blooming resistance of a tempered chocolate of the abovementioned tendency can be improved.

The present inventors have conducted extensive studies in order to satisfy the various demands for chocolates. As a result, they have found that the above-mentioned object can be achieved by combining two specific fats and oil.

Accordingly, the present invention has been completed based on the above finding and provides a fat and oil composition which is suitably used in chocolates and comprises from 10 to 90% by weight of the following fat and oil (A) and from 90 to 10% by weight of the following fat and oil (B):

fat and oil (A): a fat and oil substantially comprising 2-unsaturated-1,3-saturated glyceride(s) as the main component and having an iodine value of from 25 to 50; and fat and oil (B): a fat and oil containing from 30 to 85% by weight of triglycerides, wherein the total carbon atom number of the constituting fatty acids is from 24 to 46 and the ratio of the $C_{32}$ content to the $C_{40}$ content ranges from 0.01 to 0.5 while the ratio of the $C_{32}$ content to the $C_{42}$ content ranges from 0.01 to 0.7 (wherein $C_{32}$, $C_{40}$ and $C_{42}$ respectively refer to triglycerides of the total carbon atom numbers of the constituting fatty acids of 32, 40 and 42).

When added to chocolates, the fat and oil composition of the present invention can improve, for example, the hardness, meltability and blooming resistance of the chocolate. As a result, the obtained chocolate becomes widely applicable to, for example, composite chocolate products. Furthermore, it is possible to achieve physical properties, whereby the chocolates can be taken at the best flavor, depending on the temperature of a salesroom and the season.

DETAILED DESCRIPTION OF THE INVENTION

Example of the 2-unsaturated-1,3-saturated glyceride, i.e., the major component of the fat and oil (A) to be used in the present invention, include 2-oleo-1,3-distearin, 2-oleo-1,3-dipalmitin, 2-oleo-1-palmito-3-stearin, 2-oleo-1-stearo-3-arachidin, 2-oleo-1-palmito-3-behenin, 2-oleo-1-stearo-3-behenin and 2-oleo-1,3-behenin. These triglycerides may optionally be combined with each other depending on the purpose. It is preferable that the fat and oil (A) contain these 2-unsaturated-1,3-saturated glycerides at a ratio of 50% by weight or above, more preferably 50 to 90% by weight.

In addition to the 2-unsaturated-1,3-saturated glyceride, the fat and oil (A) may contain various glycerides including 1,2,3-saturated, 1,2-unsaturated-3-saturated and 1,2,3-unsaturated ones. In particular, the content of 1,2,3-saturated glycerides is preferably 5% by weight or below, more preferably 3% by weight or below.

Particular examples of the fat and oil (A) include cacao butter, sal fat, illipe fat, shea fat, kokum fat and palm oil. Further, fractions obtained by fractionating these fats and oil are also available. Furthermore, fats and oil which have been transesterified with lipase may be used. Furthermore, a fat and oil composition obtained by blending two or more fats and oil selected from among the above-mentioned ones may be used so long as it has an iodine value of from 25 to 50.

Examples of the fat and oil (B) to be used in the present invention include milk fat, hardened milk fat and fractionated milk fat. Further, enzymatically synthesized fats and oil which are comparable in qualities to the above-mentioned ones may be used. Furthermore, these fats and oil may be combined with common vegetable fats and oil. Coconut oil and palm kernel oils are known as fats and oil containing triglycerides of a total carbon atom number of the constituting fatty acids of from 24 to 46. In these fats and oil, however, the ratio of the $C_{32}$ content to the $C_{40}$ content and the ratio of the $C_{32}$ content to the $C_{42}$ content are each at least 0.7 (wherein $C_{32}$, $C_{40}$ and $C_{42}$ respectively refer to triglycerides of the total carbon atom numbers of the constituting fatty acids of 32, 40 and 42). Thus these fats and oil are undesirable from the viewpoint of the compatibility with the fat and oil (A). These fats and oil can be made available in the present invention by controlling the $C_{32}$ to $C_{40}$ ratio and the $C_{32}$ to $C_{42}$ ratio respectively to from 0.01 to 0.5 and from 0.01 to 0.7 by, for example, transesterification, fractionation or hardening.

The fat and oil composition of the present invention may be obtained by blending from 10 to 90% by weight of the fat and oil (A) with from 90 to 10% by weight of the fat and oil (B).

The fat and oil composition of the present invention can impart desired characteristics to a chocolate by varying the ratio of the fat and oil (A) to the fat and oil (B) within the range as specified above. For example, a composition containing a large amount of the fat and oil (B) may be used as a fat and oil composition for center cream which has a good meltability in mouth and shows little change with time. This fat and oil composition for center cream may preferably contain 10 to 40% by weight of the fat and oil (A), which comprises 2-oleo-1,3-dipalimitin as the major component, and 90 to 60% by weight of the fat and oil (B). A composition containing a large amount of the fat and oil (A) may be used for applications including solid and coating, similar to common hard butter. When these fat and oil compositions are added to chocolates, the obtained chocolates show characteristics different from those containing conventional hard butter. The fat and oil composition which is preferably used as a hard butter comprises 60 to 90% of the fat and oil (A) and 40 to 10% of the fat and oil (B). This hard butter differs from conventional ones in that the hardness is reduced at a low or room temperature and that the solubility and meltability in mouth are improved. A composition comprising hardened milk fat as the fat and oil (B) gives chocolates excellent in blooming resistance. In this case, the fat and oil (B) is contained in an amount of from 10 to 30%, depending on the degree of hardening. When the fat and oil composition of the present invention comprising 50 to 70% by weight of the fat and oil (A) which contains 50 to 90% by weight, based on the fat and oil (A), of 2-oleo-1,3-distearin as the major component and 50 to 30% by weight of the fat and oil (B) is added to a chocolate, the obtained chocolate has a soft texture at a low or room temperature and is suitably used for coating. When the fat and oil composition of the present invention comprising 40 to 60% by weight of the fat and oil (A) which contains 50 to 90% by weight, based on the fat and oil (A), of 2-oleo-1,3-dipalmitin as the major component and 60 to 40% by weight of the fat and oil (B) is added to a chocolate, the obtained chocolate shows an excellent solubility and is suitably used in, for example, a chocolate/cream composite. When added to chocolates, therefore, the fat and oil composition of the present invention can improve the physical properties of the chocolates and thus give products having novel characteristics. Thus it is highly useful in the diversification of chocolate products.

The fat and oil composition of the present invention may be preferably contained in a chocolate in an amount of from 5 to 50% by weight.

The term "chocolates" as used herein involves not only those containing cacao butter and fats and oil similar thereto as a fat and oil component, i.e., so-called sweet chocolates and milk chocolates, but also those containing not cacao butter but fats and oil similar thereto. Furthermore, products containing nut paste or fruit powder free from any cacao products, for example, cacao mass or cacao powder, as a flavor component are involved therein.

To further illustrate the present invention, and not by way of limitation, the following Example will be given wherein all % and parts are by weight.

EXAMPLE 1

A fat and oil composition of the present invention comprising 50% of refined sal fat having an iodine value of 40.5 and containing 74% of 2-unsaturated-1,3-saturated glycerides (this refined sal fat contains 47% of 2-oleo-1,3-distearin) and 50% of milk fat containing 62% of triglycerides of the total carbon atom number of the constituting fatty acids of from 24 to 46, wherein the ratio of the content of $C_{32}$ to the content of $C_{40}$ was 0.24 and the ratio of the content of $C_{32}$ to the content of $C_{42}$ was 0.36 (wherein $C_{32}$, $C_{40}$ and $C_{42}$ respectively refer to triglycerides of the total carbon atom numbers of the constituting fatty acids of 32, 40 and 42) was blended with other ingredients in accordance with the following recipe and the obtained mixture was refined and conched in a conventional manner. The chocolate dough thus obtained was tempered to thereby give a mold chocolate. When taken at a material temperature of 15° C., this chocolate had a sort texture.

| Recipe of chocolate: | (part) |
| --- | --- |
| sugar | 50 |
| cacao mass | 30 |
| fat and oil composition | 15 |
| cacao butter | 5 |
| lecithin | 0.4 |
| vanillin | 0.03 |

EXAMPLE 2

A fat and oil composition of the present invention comprising 80% of fractionated palm fat having an iodine value of 48.0 and containing 63% of 2-unsaturated-1,3-saturated glycerides (this fractionated palm fat contains 50% of 2-oleo-1,3-dipalmitin) and 20% of milk fat containing 62% of triglycerides of the total carbon atom number of the constituting fatty acids of from 24 to 46, wherein the ratio of the content of $C_{32}$ to the content of $C_{40}$ was 0.24 and the ratio of the content of $C_{32}$ to the content of $C_{42}$ was 0.36 (wherein $C_{32}$, $C_{40}$ and $C_{42}$ respectively refer to triglycerides of the total carbon atom numbers of the constituting fatty acids of 32, 40 and 42) was blended with other ingredients in accordance with the following recipe and the obtained cream was refined, conched and tempered in a conventional manner. This cream was highly excellent in meltability in mouth.

| Recipe of cream: | (part) |
| --- | --- |
| sugar | 40 |
| strawberry powder | 10 |
| fat and oil composition | 50 |
| lecithin | 0.4 |
| flavor | q.x. |

EXAMPLE 3

Milk fat of an iodine value of 32.5 was hardened in the presence of 0.5% of a nickel catalyst under a hydrogen pressure of 3 kg/cm² at a reaction temperature of 200° C. to thereby give a hardened oil of an iodine value of 0.8. The obtained hardened oil contained 68% of triglycerides of the total carbon atom number of the constituting fatty acids of 24 to 46 and had the ratio of the content of $C_{32}$ to the content of $C_{40}$ of 0.23 and the ratio of the content of $C_{32}$ to the content of $C_{42}$ of 0.35 (wherein $C_{32}$, $C_{40}$ and $C_{42}$ respectively refer to triglycerides of the total carbon atom numbers of the constituting fatty acids of 32, 40 and 42). A fat and oil composition of the present invention comprising 20% of said hardened oil and 80% of tempered hard butter having an iodine value of 35.5 and containing 79% of 2-unsaturated-1,3-saturated glycerides was prepared. Then a chocolate comprising this fat and oil composition was produced in accordance with the following recipe in a conventional manner. The obtained chocolate was aged at 20° C. for 20 days and then subjected to a blooming test where the chocolate was allowed to stand at 20° C. for 12 hours and then at 30° C. for 12 hours per cycle. As a result, blooming was observed on the 51st day.

| Recipe of chocolate: | (part) |
| --- | --- |
| sugar | 45 |
| whole milk powder | 20 |
| cacao mass | 15 |
| cacao butter | 10 |
| fat and oil composition | 10 |
| lecithin | 0.4 |
| vanillin | 0.03 |

EXAMPLE 4

1000 g of milk fat was dissolved in 3000 g of acetone at 40° C., cooled to 17° C. in 3 hours and maintained at this temperature for 30 minutes. The crystals thus precipitated were filtered and the solvent was removed. After purifying, a hardened milk fat was obtained. The obtained fat contained 49% of triglycerides of the total carbon atom number of the constituting fatty acids of 24 to 46 and had the ratio of the content of $C_{32}$ to the content of $C_{40}$ of 0.03 and the ratio of the content of $C_{32}$ to the content of $C_{42}$ of 0.03 (wherein $C_{32}$, $C_{40}$ and $C_{42}$ respectively refer to triglycerides of the total carbon atom numbers of the constituting fatty acids of 32, 40 and 42). A fat and oil composition of the present invention comprising 75% of said hardened milk fat and 25% of fractionated shea fat having an iodine value of 34.0 and containing 85% of 2-unsaturated-1,3-saturated glycerides (this fractionated shea fat contains 74% of 2-oleo-1,3-dipalmitin) was prepared. Then a chocolate comprising this fat and oil composition was produced in accordance with the following recipe in a conventional manner. The obtained chocolate had a soft texture and a high solubility and suffered from little change in texture with time.

| Recipe of chocolate: | (part) |
| --- | --- |
| sugar | 45 |
| whole milk powder | 20 |
| cacao mass | 15 |
| cacao butter | 10 |
| fat and oil composition | 10 |
| lecithin | 0.4 |
| vanillin | 0.03 |

EXAMPLE 5

A fat and oil composition of the present invention comprising 50% of fractionated palm fat having an iodine value of 35.3 and containing 91% of 2-unsaturated-1,3-saturated glycerides (this fractionated palm fat contains 67% of 2-oleo-1,3-dipalmitin) and 50% of milk fat containing 62% of triglycerides of the total carbon atom number of the constituting fatty acids of from 24 to 46, wherein the ratio of the content of $C_{32}$ to the content of $C_{40}$ was 0.24 and the ratio of the content of $C_{32}$ to the content of $C_{42}$ was 0.36 (wherein $C_{32}$, $C_{40}$ and $C_{42}$ respectively refer to triglycerides of the total carbon atom numbers of the constituting fatty acids of 32, 40 and 42) was blended with other ingredients in accordance with the following recipe and the obtained cream was refined, conched and tempered in a conventional manner. This cream was highly excellent in melt-ability in mouth.

| Recipe of cream: | (Part) |
| --- | --- |
| sugar | 40 |
| strawberry powder | 10 |
| fat and oil composition | 50 |
| lecithin | 0.4 |
| flavor | q.x. |

COMPARATIVE EXAMPLE 1

A chocolate of the same recipe as that of Example 1 except that the fat and oil composition was replaced with cacao butter was produced. When the product was compared with that of Example 1, the latter was obviously superior to the former in soft texture.

COMPARATIVE EXAMPLE 2

A chocolate of the same recipe as that of Example 3 except that the fat and oil composition was replaced with cacao butter was produced. When subjected to the same blooming test as the one of Example 3, the chocolate showed blooming on the 28th day.

What is claimed is:

1. A fat and oil composition for addition to chocolates, said composition consisting essentially of from 10 to 90% by weight of the following fat and oil (A) and from 90 to 10% by weight of the following fat and oil (B):

fat and oil (A): a fat and oil substantially comprising 2-unsaturated-1,3-saturated glyceride(s) as the main component and having an iodine value of from 25 to 50; and fat and oil (B): a fat and oil containing from 30 to 85% by weight of triglycerides, balance non-triglyceride fat constituents, wherein the total carbon atom number of the constituting fatty acid is from 24 to 46 and the ratio of the $C_{32}$ content to the $C_{40}$ content ranges from 0.01 to 0.5 while the ratio of the $C_{32}$ content to the $C_{42}$ content ranges from 0.01 to 0.7 (wherein $C_{32}$, $C_{40}$ and $C_{42}$ respectively refer to triglycerides of the total carbon atom numbers of the constituting fatty acids of 32, 40 and 42);

said composition, when added to a chocolate in an amount from about 5 to about 50% by weight, producing a chocolate product having softened texture or improved mouth-meltability.

2. A fat and oil composition as claimed in claim 1, wherein said fat and oil (A) contains a 50% by weight or above of 2-unsaturated-1,3-saturated-glycerides.

3. A fat and oil composition as claimed in claim 1, wherein said fat and oil (A) is a fat and oil selected from the group consisting of cacao butter, sal fat, illipe fat, shea fat, kokum fat, palm oil and those obtained by fractionating these fats and oil.

4. A fat and oil composition as claimed in claim 1, wherein said fat and oil (B) is a fat and oil selected from the group consisting of milk fat, hardened milk fat and fractionated milk fat.

* * * * *